United States Patent [19]
Carnewal et al.

[11] 3,816,981
[45] June 18, 1974

[54] ROTARY AIR FILTER
[75] Inventors: Jose A. C. L. Carnewal, Eeklo;
Trudo M. J. Decruyenare,
Wevelgem; Georges M. Mesure,
Zedelgem, all of Belgium
[73] Assignee: Clayson N.V., Zedelgem, Belgium
[22] Filed: May 19, 1972
[21] Appl. No.: 254,985

[30] Foreign Application Priority Data
May 24, 1971 Belgium .............................. 51055

[52] U.S. Cl................. 55/267, 55/290, 55/404,
55/406, 55/467
[51] Int. Cl........................................... B01d 46/26
[58] Field of Search ............ 55/290, 267, 385, 400,
55/404, 405, 406, 467

[56] References Cited
UNITED STATES PATENTS
1,860,697  5/1932  Traviss................................ 55/404
2,441,631  5/1948  Hills................................... 55/404
3,002,585  10/1961 Pasturczak........................... 55/404
3,292,347  12/1966 Hodgkinson......................... 55/400
3,392,512  7/1968  Ziolko et al. ....................... 55/400
3,475,883  11/1969 Sullivan.............................. 55/290

Primary Examiner—Bernard Nozick
Attorney, Agent, or Firm—Frank A. Seemar; Joseph A. Brown; John R. Flanagan

[57] ABSTRACT

A rotary air filter for a radiator or the like. The filter screen is rotatably installed with the characteristic that between the free circumferential edge of the filter screen and the immovable part along which the latter rotates, an open circumferential gap is provided and that the fan which displaces the air that is to be filtered, is installed in such respect to the aforesaid open gap so that the latter is situated at the pressure side of the aforesaid fan.

6 Claims, 10 Drawing Figures

ROTARY AIR FILTER

BACKGROUND OF THE INVENTION

This invention relates to a rotary air filter which can generally be applied on all sorts of devices which have to operate in a dusty atmosphere and by which air from this dusty atmosphere has to pass through rather small openings in a functional element and by which there is a danger that the mentioned openings get plugged up when taking no special precautions.

Particularly, such a rotary air filter can for example be applied on cooling devices, such as cooling devices for the cooling of internal combustion engines; cooling devices which are used for the cooling of working oil of hydraulic equipments, etc.

An application of it can be found on harvesting machines, such as combines, since these machines are always working in a very dusty atmosphere since they can only efficiently harvest when the crop is ripe and dry by which during the operation a considerable amount of dust, chaff and short straw particles are displaced in the vicinity of the machine.

In order to insure an efficient operation of the air filter in such a dusty atmosphere, one has already proposed to install such a filter rotatably in front of the cooling device since a stationary filter is quickly sealed by the flying great dust particles, such as chaff, short straw particles and the like. With such air filter precautions are often taken which allow to avoid any air suction at a specific location of the filter so that at this location the sucked dust particles and the like can again be released from the filter.

However, all these know devices have the main disadvantage that nevertheless great dust particles such as chaff and/or short straw particles enter inside the filter and in this way are sucked against the cooling device because the great problem with such rotating air filters is formed by the sealing between the rotating dust screen and the fixed part or support opposite to which this anti dust screen is installed rotatably.

OBJECTS AND SUMMARY OF THE INVENTION

The invention relates to a rotating filter device or anti dust screen for keeping the cooling air free from dust which has to pass through the cooling device of an engine or hydraulic equipment, in which the aforesaid disadvantage of the known rotating filter devices is totally excluded and with which an optimum cooling is obtained. The air filter construction of this invention is relatively simple and inexpensive.

The rotary air filter according to this invention has between the free circumferential edge of the filter body and the immovable part along which the latter rotates, a gap. The fan which displaces the cooling air through the cooling device, is installed in such respect with the aforesaid open gap so that the latter is situated at the pressure side of the aforesaid fan.

BRIEF DESCRIPTION OF THE DRAWINGS

In order to better illustrate the characteristics of the present invention, we describe here as an example without any restructing character a few preferred embodiments with reference to the enclosed figures in which.

DETAILED DESCRIPTION

Figure 1:
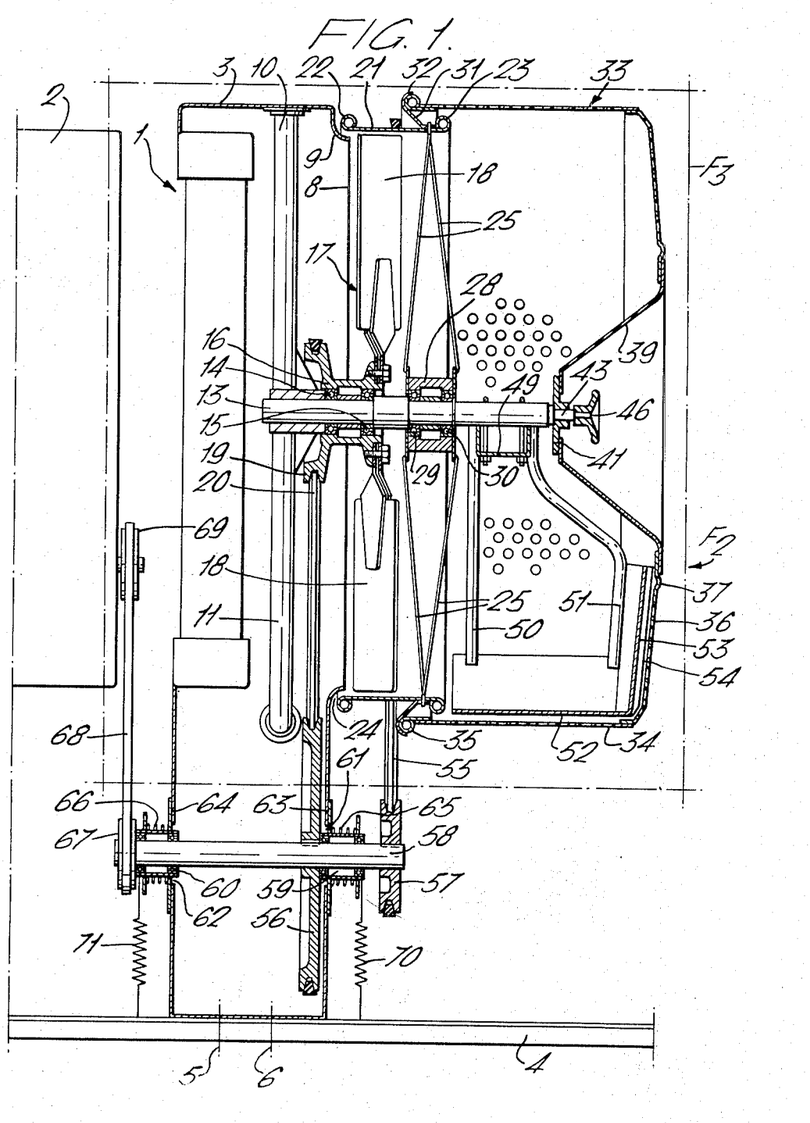
FIG. 1 in axial section, schematically represents a disposition of a rotary air filter according to the invention in relationship to an engine cooling device as well as a drive of such an air filter.
Figure 2:
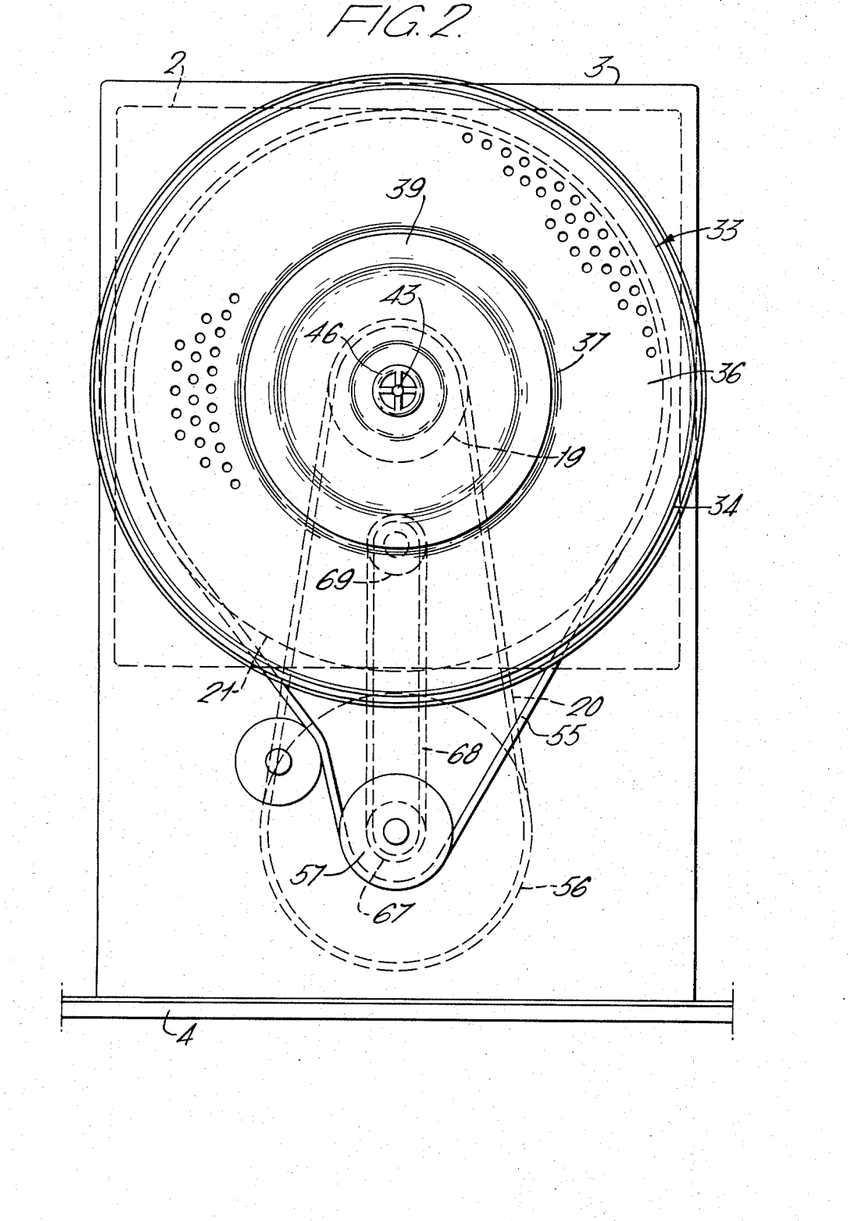
FIG. 2 is a view according to arrow F2 in FIG. 1.
Figure 3:
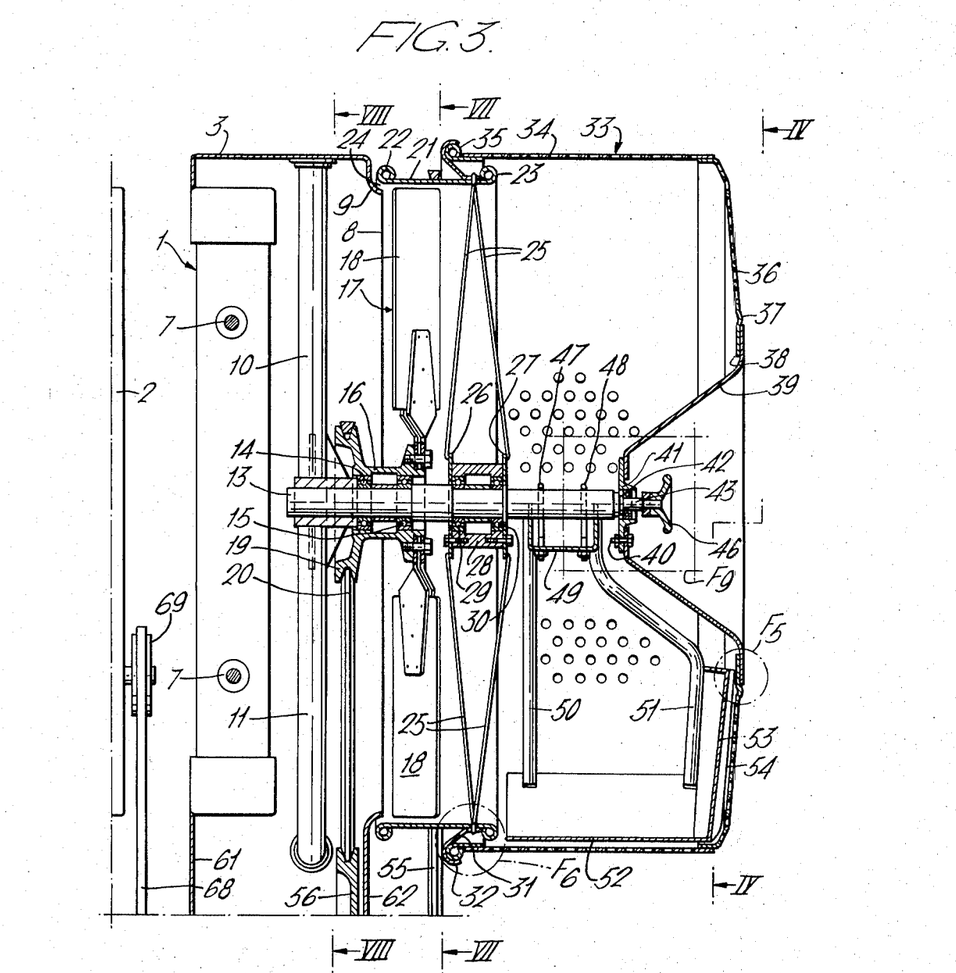
FIG. 3 represents on a larger scale and in more details the part that is indicated in FIG. 1 by F3.

FIGS. 1 and 2 schematically represents a radiator or cooling device 1 through which the cooling fluid of an engine flows. According to the present invention, this cooling device is fixed in a casing 3 which in turn is fixed with the machine frame 4 for example by means of schematically indicated bolts or the like, respectively 5–6. The cooling device 1 is preferably suspended in the casing by means of rubber blocks 7. The casing forms a closed unit about the cooling device, the casing having a circular opening 8 on the front side which is bordered by a collar 9.

Figure 8:
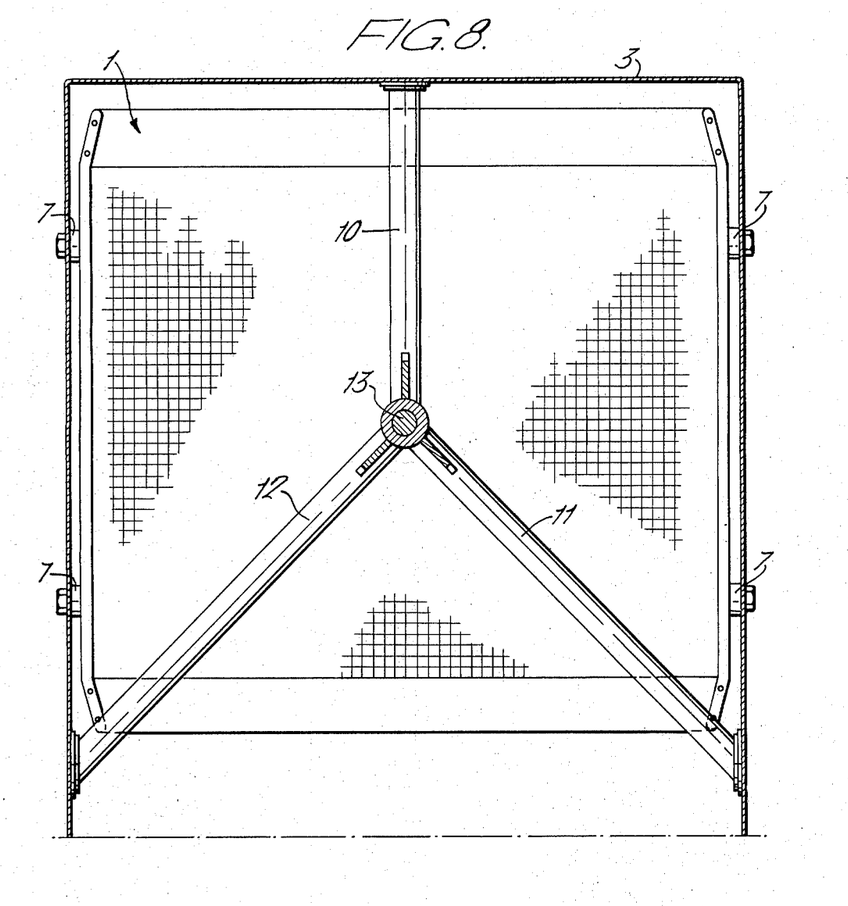
FIG. 8 is a sectional view along line VIII—VIII in FIG. 3.
Figure 9:
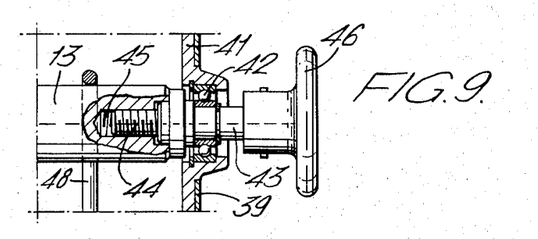
FIG. 9 represents on a larger scale the part that is indicated in FIG. 3 by F9.

Three supports 10, 11, 12 (FIG. 8) are fixed in the casing and a shaft 13 is unmovably connected to the supports, the shaft being installed approximately in the middle of the cooling device 1 and being perpendicular to the latter. On this shaft 13, the hub 16 of a fan 17 is fixedly rotatably but axially immovably mounted by means of ball bearings, respectively 14–15. The outer diameter of the fan 17 formed by the free extreme ends of the blades 18 will preferably be somewhat larger than the diameter of the opening 8 that is provided in the aforesaid casing 3. The fan 17 is installed in such manner on shaft 13 so that it is situated in front of the aforesaid opening 8 of casing 3, in other words, outside the casing 3.

A belt sheave 19 is fixed on the fan hub 16 for the reception of a V-belt 20.

Around the aforesaid fan 17 a circumferential member or ring 21 is applied of which the side edges have bent collars, respectively 22 and 23 in order to give said ring enough solidity. The diameter of the ring 21 is chosen as such that one of the collars, in this case collar 22, is placed around the aforesaid opening 8 of casing 3 and particularly around the aforesaid collar 9 so that in this way ring 21 covers opening 8 of casing 3 whilst between this ring and the collar 9 that delimits the aforesaid opening 8 a circular clearance or gap 24 is maintained.

The ring 21 is fixed in this case on spokes or the like 25 that are connected at their other extreme end with flanges, respectively 26 and 27 which in turn are fixed with a hub 28 that is freely rotatably but axially immovably mounted on the aforesaid shaft 13 by means of ball bearings, respectively 29 and 30. At the outer circumference of ring 21, a conical ring 31 is fixed for example by spot welding, by which the free wall of this ring 31 is bent foreward in order to form a centering edge 32 as will be seen hereafter for the proper reception of a filter grate or anti dust screen 33 generally in the form of a basket.

The screen 33 is mainly formed by a cylindrical part 34 that is provided over the entire surface with perforations and of which the rearwardly directed free edge is provided with a bent collar 35 that can cooperate with the aforesaid centering means formed by the bent part 32 of the conical ring 31. An end plate 36 is connected to the foreward directed wall of the cylindrical part 34, the plate 36 being provided at a specific location with one or more circular recessings 37 to give this plate 36 a certain solidity. The plate 36 is provided with a central hole 38, and a conical part 39 is mounted within the hole.

As a matter of fact, the aforesaid filter grate or anti dust screen 33 could be constructed of one or more parts, by which, in the latter case, the different parts can be fixed to each other in any suitable way for example by rivetting, spot welding, etc.

The extreme end with the smallest diameter of the internally directed conical part 39 is secured to a flange 41 by bolts 40 or the like. The flange 41 is in turn freely rotatably supported by means of a ball bearing 42 on a shaft 43. At one side, the shaft is provided with a screw threaded part 44 that can cooperate with a screw threaded part 45 that is provided axially in the extreme end of the aforesaid shaft 13, whereas the second extreme end of this shaft 43 is provided with a hand wheel 46.

Figure 4:
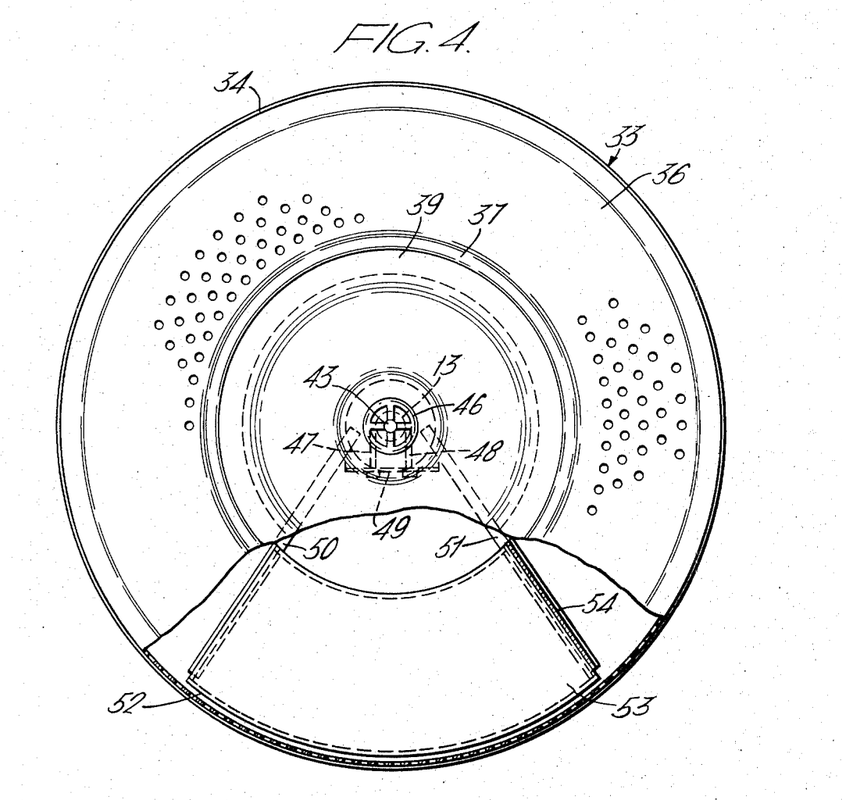
FIG. 4 is a view with sections partially taken away along line IV—IV in FIG. 3.
Figure 5:
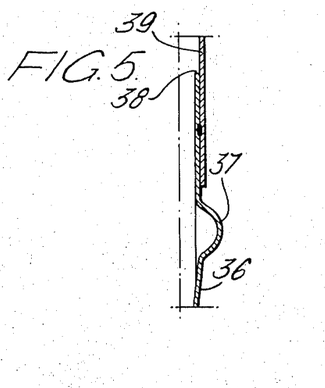
FIG. 5 represents on a larger scale the part that is indicated in FIG. 3 by F5.
Figure 6:
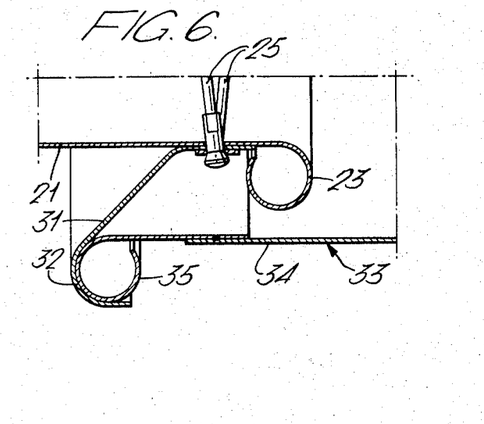
FIG. 6 represents on a larger scale the part that is indicated in FIG. 3 by F6.
Figure 7:
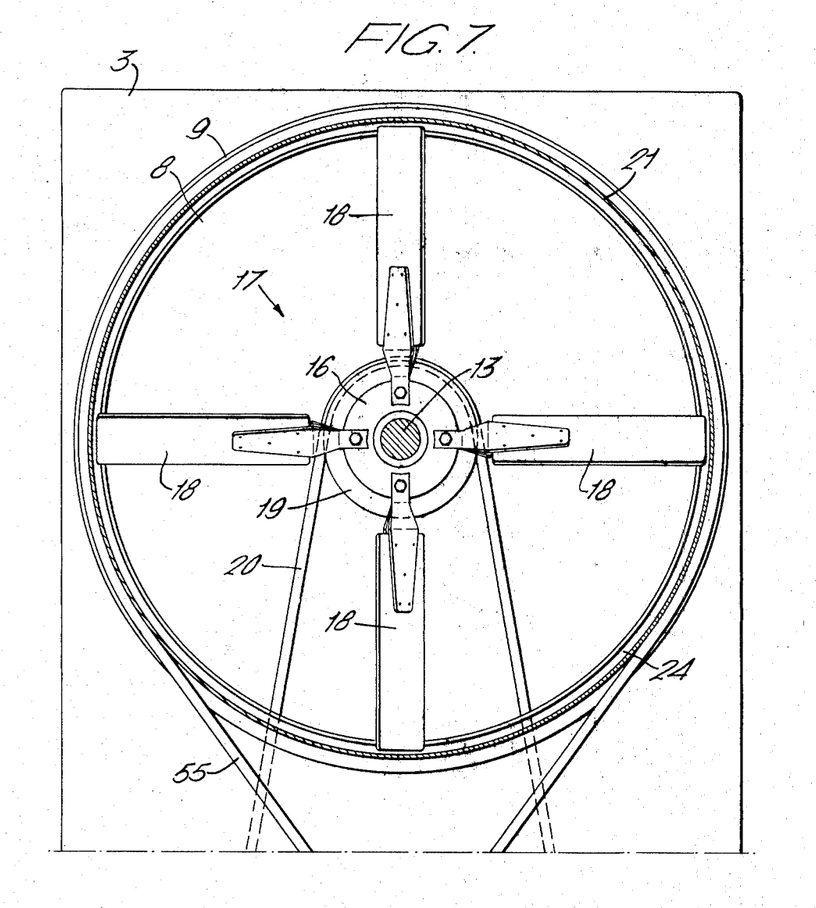
FIG. 7 is a sectional view along line VII—VII in FIG. 3.

Finally, on the aforesaid shaft 13, between the aforesaid flanges 27 and 41, by means of braces, respectively 47 and 48, (FIG. 4) a support 49 is fixed on which two rods or the like, 50 and 51 are fixed by welding. These rods support at their other extreme end a plate 52 that has a part 53 that is bent upwards. The plates 53 and 52 form an impervious segment disposed opposite to a segment part of the cylindrical part 34 and the front wall 36 of the filter grate or anti dust screen 33.

Mounted on the plate 53 is a strip of material 54 that is directed towards the plate 36 and ends at a small distance from the latter. In another preferred embodiment such a strip 54 can be formed by a brush that brushes the inner wall of the plate 36, but when possible, this will be avoided because this results in a mechanical contact.

The function of the mechanism as described above is very simple and as follows:

The aforesaid fan 17 is continuously driven by the aforesaid belt 20 whereas the anti dust screen 33 is continuously driven by means of a belt 55 that runs on the aforesaid ring 21, the fan drawing air in through the filter 33 and forcing a blowing of the filtered air through the radiator 1.

In this way dust particles, such as chaff, straw particles or the like that land against the filter screen, are detached again at the location where the aforesaid plates 52 and 53 are situated, because there is no suction at that location, this feature being old in the art.

By the provision of the aforesaid strip 54, one obtains an additional air turbulence by which the aforesaid particles are better released from such a grate.

As already known, such dust particles or the like are also kept free from the filter grate 33 by the rotary movement of this grate because the dust has less chance to get through the perforations and also because the dust particles and the like that land against the anti dust screen 33 are submitted to a centrifugal force that facilitates discharge. For that reason, the conical part 39 of the grate has not been perforated because the centrifugal force is too small at that location in order to facilitate the removal of the dust particles from the grate.

By making this part 38 conical, one obtains that the incoming air is directed in a suitable way towards the cooling device 1, whereas the fixation of the anti dust screen 33, particularly the hand wheel 46 can be applied at a protected location.

The main purpose of the present invention however, is to insure without any mechanical contact, a sealing between the rotary filter screen 33 and the fixed part of the machine, in this case the casing 3, so that at the location where the rotary part is applied opposite the fixed part, dust or the like cannot penetrate into the filter.

For that purpose, fan 17 is so positioned with respect to the cylindrical clearance or gap 24, formed between the bent collar 22 or ring 21 and the collar 9 of casing 3 so that the gap 24 is situated in the pressure zone of the fan, and the dust or the like is always kept outside at that location.

It has been found that by installing the fan in front of the cooling device that the fan will cause turbulences in front of the front side of the cooling device which also assists in avoiding plugging up of the latter.

The assembly and disassembly of such a filter element is very simple because it is only necessary to unscrew the aforesaid shaft 43 by means of the hand wheel 46, after which the filter screen 33 can be removed. During the re-installation, the positioning collar 23 and the centring edge 32 of ring 31 see to it that the filter screen with its bent wall 35 always land on the right location without any difficulty.

In FIGS. 1 and 2, the drive of such a dust filter is represented by which for that purpose the belts 20 and 55 cooperate with belt sheaves 56 and 57 that are fixed on a shaft 58.

The latter is rotatably mounted by means of suitable bearings in bushings, 59 and 60 respectively that pass through elongated openings, 61 and 62 respectively in the walls of the casing 3. Opposite these openings 61 and 62 on the bushings 59 and 60 sealing plates are applied 63 and 64 respectively that are pressed all the time by means of springs, 65 and 66 respectively against the concerned wall of casing 3. Furthermore, on shaft 58 a belt sheave 67 is fixed which is connected by a belt 68 with a belt sheave 69 that is driven from the engine 2.

The bushings 59 and 60 are finally connected by means of springs, 70 and 71 respectively with a fixed part of the machine in order to constantly tighten the belts 20–55 and 68 without releasing the openings 61 and 62 so that there is no pressure loss or practically no pressure loss.

Figure 10:
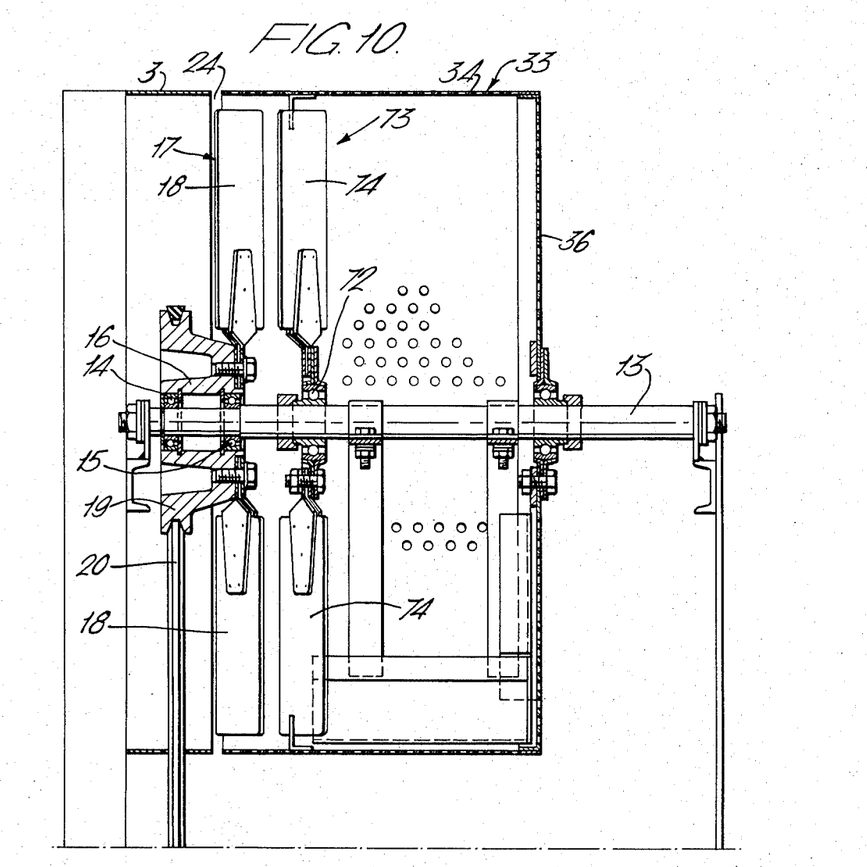
FIG. 10 is a sectional view similar to the one of FIG. 3 of a rotary air filter according to an alternative preferred embodiment.

In an alternative preferred embodiment as represented in drawing 10, the anti dust screen 33 is driven by the cooling air itself that is sucked through the filter screen 33 by means of fan 17. For that purpose, on shaft 13 that is constructed in this case in another way, as in the previous example, by means of a ball bearing 72, a fan 73 is provided of which the blades 74 are connected in a suitable way with the cylindrical wall 34 of the filter screen. It is clear that when air is sucked by the rotating movement of fan 17 through the filter screen, the latter obtains a rotating movement by the action of this sucked air on the blades 74 of fan 73. In this case, such as in the previous example, a circular clearance or gap 24 is formed between the proper filter screen 33 and the casing or the like 3, by which the circular gap is situated at the pressure side of fan 17.

In this way, one obtains an air filter that releases the sucked air from great dust particles such as for example chaff, straw particles and the like, and by which the sealing is formed without any mechanical contact so that there are neither friction losses nor wear.

The present invention is not all restricted to the embodiments, described as an example and represented on the enclosed drawings, but such a dust filter can be realized in all shapes and dimensions without departure from the invention.

Having thus described our invention, what we claim is:

1. In combination with a radiator mounted within a casing having a generally circular collar portion which defines a generally circular opening to the front side of the radiator; the combination therewith of a fan rotatably mounted forwardly of the collar and drive means for rotating the fan to force filtered air through said opening and said radiator, and a rotary air filter assembly having a filtering structure circular in cross-section including drive means disposed forwardly of said fan and having a rotatable circumferential member attached thereto disposed circumferentially about said fan, the circumferential member being impervious and spaced away from the collar portion to provide a generally circumferential gap thereabout, the fan blades extending beyond said collar to create at least a small overpressure at the location of the gap during rotation of the fan thereby preventing atmospheric air from penetrating said gap during the operation of said fan.

2. The combination set forth in claim 1 further characterized by the provision of a forwardly extending shaft having a center line generally concentric with the generally circular opening in the casing, the fan and the rotary air filter assembly being journalled for rotation about said shaft.

3. The combination set forth in claim 1 in which the rotary air filter assembly is supported on a shaft perpendicular to and concentric with the generally circular opening in the casing, the rotary air filter assembly being driven by a second fan journalled about said shaft.

4. The combination set forth in claim 1 in which said filtering structure has a generally cylindrical portion and a forward generally circular portion, the combination further being characterized by the provision of an impervious segment disposed within the cylindrical portion, the impervious segment having a radially directed strip or extension that is directed towards the circular portion of the filter structure but which does not touch it.

5. The combination set forth in claim 1 in which the circumferential member and the filtering structure of the rotary air filter assembly are joined together and are mounted with respect to the fan to rotate about an axis concentric with the axis of rotation for the fan.

6. The combination set forth in claim 5 in which the circumferential member is formed by a ring of which both sides are bent, this ring having a conical extension with a bent free wall adapted to meet with the rearward edge of said filtering structure to center the later with respect to said circumferential member.

* * * * *